(12) United States Patent
Filo

(10) Patent No.: US 6,831,437 B2
(45) Date of Patent: Dec. 14, 2004

(54) WALKING PLATFORMS WITH AUTOMATIC SELF-STABILIZATION

(75) Inventor: Andrew S. Filo, 22670 Oakcrest Ct., Cupertino, CA (US) 95014

(73) Assignee: Andrew S. Filo, Cupertino, CA (US)

( * ) Notice: Subject to any disclaimer, the term of this patent is extended or adjusted under 35 U.S.C. 154(b) by 0 days.

(21) Appl. No.: 10/134,579

(22) Filed: Apr. 29, 2002

(65) Prior Publication Data

US 2002/0130632 A1 Sep. 19, 2002

Related U.S. Application Data

(63) Continuation of application No. 09/782,556, filed on Feb. 13, 2001, now abandoned.
(60) Provisional application No. 60/182,267, filed on Feb. 14, 2000.

(51) Int. Cl.$^7$ .................................................. B25J 5/00
(52) U.S. Cl. ..................... 318/568.12; 318/568.11; 318/568.14; 318/568.15; 318/568.16; 318/568.17; 318/568.19; 318/568.22; 701/23; 901/1; 901/6
(58) Field of Search ....................... 318/561, 568–568.2, 318/568.22, 560, 568.12; 700/245–264; 901/1, 6; 701/23; 446/268, 335

(56) References Cited

U.S. PATENT DOCUMENTS

| | | | | |
|---|---|---|---|---|
| 4,095,367 A | * | 6/1978 | Ogawa | ........................ 46/105 |
| 4,834,200 A | | 5/1989 | Kajita | |
| 5,040,626 A | | 8/1991 | Paynter | |
| 5,049,802 A | | 9/1991 | Mintus et al. | |
| 5,151,859 A | * | 9/1992 | Yoshino et al. | ........ 364/424.02 |
| 5,158,493 A | * | 10/1992 | Morgrey | ..................... 446/355 |
| 5,159,988 A | | 11/1992 | Gomi et al. | |
| 5,209,695 A | * | 5/1993 | Rothchild | .................... 446/175 |
| 5,220,263 A | | 6/1993 | Onishi et al. | |
| 5,221,883 A | | 6/1993 | Takenaka et al. | |
| 5,252,901 A | | 10/1993 | Ozawa et al. | |
| 5,255,753 A | | 10/1993 | Nishikawa et al. | |
| 5,318,471 A | * | 6/1994 | Glovier | ..................... 446/268 |
| 5,337,235 A | | 8/1994 | Takahashi et al. | |
| 5,355,064 A | | 10/1994 | Yoshino et al. | |
| 5,426,586 A | | 6/1995 | Ozawa | |
| 5,455,497 A | | 10/1995 | Hirose et al. | |
| 5,513,106 A | | 4/1996 | Yoshino et al. | |
| 5,545,967 A | | 8/1996 | Osborne et al. | |
| 5,841,258 A | * | 11/1998 | Takenaka | ............... 318/568.12 |
| 5,842,533 A | | 12/1998 | Takeuchi | |
| 5,892,346 A | | 4/1999 | Moroto et al. | |
| 5,929,585 A | | 7/1999 | Fujita | |

* cited by examiner

*Primary Examiner*—Rina Duda
*Assistant Examiner*—Tyrone Smith
(74) *Attorney, Agent, or Firm*—Michael Best & Friedrich LLP

(57) ABSTRACT

A walking platform that achieves automatic self-stabilization includes a motor within the mid-region of the platform that is in communication with a crankshaft. The crankshaft has a connecting rod that is rotatably attached to it. The connecting rod, in turn, has a pole that is rotatably attached to it. There is a foot attached that is capable of supporting the weight of the platform. The motor is powered by a battery that causes the components of the platform to simulate a walking motion. This battery is attached to the lower portion of the platform in order to lower the center of gravity of the platform. The platform also includes at least one levered component that is rotatably attached to the platform, allowing it to pivot freely and dampen oscillations produced by the walking platform.

19 Claims, 5 Drawing Sheets

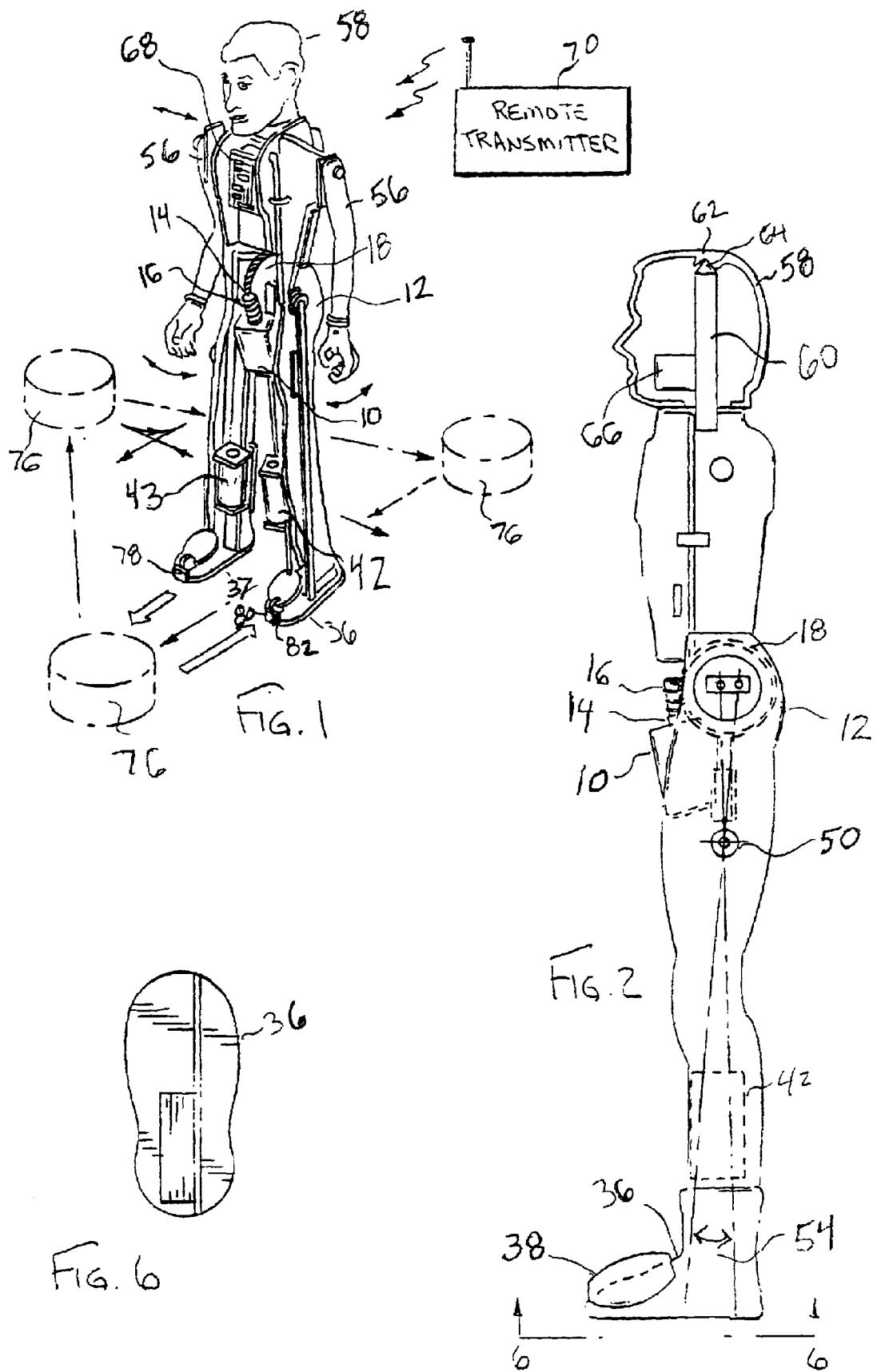

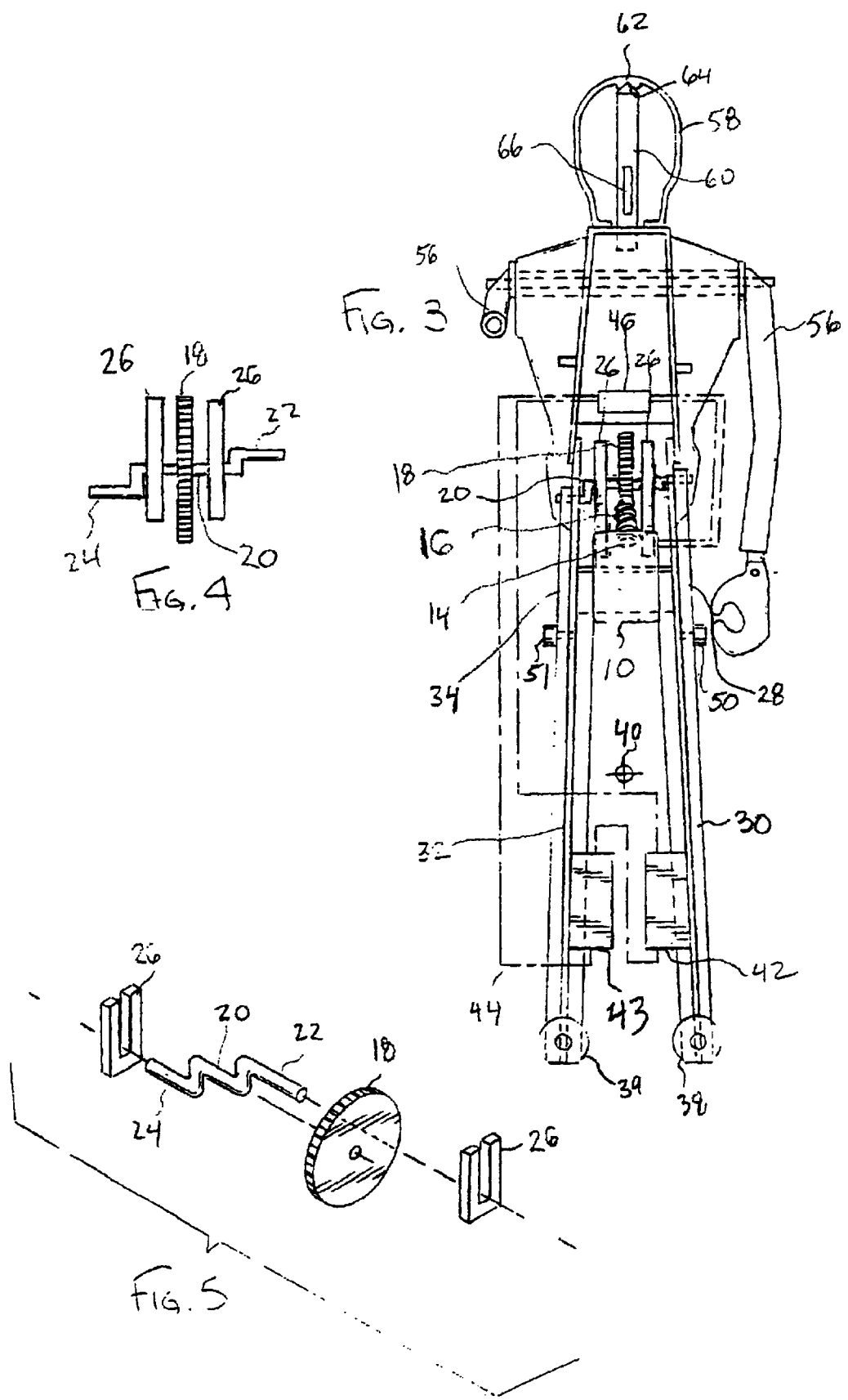

WALKING PLATFORMS WITH AUTOMATIC SELF-STABILIZATION

CROSS-REFERENCE TO RELATED APPLICATION

This is a continuation of prior application Ser. No. 09/782,556, filed Feb. 13, 2001 now abandoned, which application claims benefit of U.S. provisional application No. 60/182,267, filed Feb. 14, 2000.

BACKGROUND OF THE INVENTION

1. Field of the Invention

The invention relates to walking platforms that achieve stabilization and, more particularly, to bipedal anthropomorphic walking platforms that achieve such stabilization while closely imitating the movement of the human body.

2. Description of the Related Art

There are numerous examples in the prior art of walking platforms that try to achieve realistic movement, such as exhibited by human beings as they walk, while maintaining stabilization and preventing toppling. However, these prior art solutions are not satisfactory for several reasons.

One problem with walking platforms found in the prior art is that they exhibit poor stability. This is so because they are not capable of maintaining balance while they walk due to the design of their structural elements. As they walk, their center of gravity, which is initially high to begin with, moves within the stability envelope of the platform in such a fashion that it comes dangerously close to the edge of that envelope, or outside of it, thereby causing them to topple over. Unlike human beings, they lack the ability to adjust the position of their center of gravity both at rest and while they are walking. Accordingly, there exists a need to provide a walking platform that maintains its stability while imitating the movement of the human body as it walks.

Another related problem is that walking platforms in the prior art typically exhibit a slow stride. Since these platforms do not have good stability, the speed of their stride is limited because this speed tends to contribute to their tendency to topple over. In addition, increasing the length of the stride makes it more likely that their center of gravity will come closer to the edge of their stability envelope or exceed it. Consequently, the prior art platforms are relatively slow moving. Finally, without the ability to modify the stride, bipedal platforms found in the prior art cannot turn in a manner that it is similar to that of human beings. Accordingly, there exists a need for a walking platform that is capable of changing the speed of its stride and of turning in a fashion that is similar to that performed by human beings.

Yet another problem found with the platforms found in the prior art is that they tend to exhibit in place wobbling or toppling of the platform. This is caused by the self-induced oscillation caused by the motor and the platform itself. This problem is oftentimes exacerbated by the use of arms and legs which are also driven by the motor, thereby increasing these oscillations and causing the toppling to occur more frequently. Accordingly, there exists a need for a walking platform that can dampen these oscillations in a more effective and anthropomorphic way.

The solutions found in the prior art for poor stability, slow stride, and self-induced oscillation are not acceptable for two reasons. First, these solutions sometimes include external devices such as suction cups or wheels. These solutions are not acceptable for certain instances, such as toy and robotic applications, where these solutions render the walking platform very unlike humans and therefore run contrary to the purpose of the platform. Second, these solutions sometimes rely on active electronic compensation that use gyroscopes. The gyroscopes work with foot sensors which send signals to a brain which monitors the stability of the platform and compensates accordingly. In addition, these solutions require the continuous operation of numerous motors. The platforms will subsequently fall over if the power is shut off. As can be seen, this solution is also not anthropomorphic and can be cost prohibitive. Accordingly, there exists a need for a walking platform that can eliminate the problems of poor stability, slow stride, and self-induced oscillation in a manner that is both anthropomorphic and cost effective.

SUMMARY OF THE INVENTION

In accordance with the present invention, a walking platform is provided that eliminates the problems of poor stability, slow stride, and self-induced oscillation in a manner that is anthropomorphic. This is achieved by providing a very low and consistently positioned center of gravity for the platform, by providing an effective means of controlling the stride of the platform, and by providing an effective way to dampen oscillations through the use of levered components. The result is a platform with greater stability, superior aesthetics, and a body that moves more uniformly, like that of a human being, than prior art platforms. This invention can be used on platforms of any size, including toys that are six inches tall, to an adult human's size, and to even larger platforms. These platforms, in turn, can be used in a wide variety of applications ranging from toys to advertising, to robotics.

One embodiment of the invention includes a motor, typically within the mid-region of the platform, that has a drive shaft extending from it. Next, the drive shaft is connected to another component of the invention, the crankshaft. The crankshaft, in turn, is in communication with the connecting rod which is rotatably attached to the pole. Near the bottom of the pole, there is a foot capable of sustaining the weight of the platform. The foot also has a weight attached to it, thereby lowering the center of gravity of the platform and making it more stable. Finally, the invention includes at least one levered component, such as an arm, that is free to pivot, thereby providing means to dampen oscillations caused by any motion of the platform itself. This freedom allows the platform to automatically compensate during its motion, similar to how dangling appendages of human beings help them to maintain stability while walking. This is an improvement compared to prior art platforms that have appendages that are driven by the motor and cannot provide any inertial compensation.

The platform is powered by a battery, which may be attached to the lower portion of the platform, that supplies current to the motor. The low position of the battery, like the weight attached to the foot, helps to lower the center of gravity of the platform and increases its stability. As current is supplied by the battery to the motor, the drive shaft rotates, which also causes the crank shaft to rotate. This rotation is then converted to a stepping motion of the connecting rod and pole, resulting in a walking motion. As this embodiment of the invention has only one connecting rod and pole that act like a human leg, the platform stays in one position as its leg causes it to rotate in place.

BRIEF DESCRIPTION OF THE DRAWINGS

FIG. 1 is a perspective view of a bipedal and fully anthropomorphic platform that can be remotely controlled or can walk toward objects using an infrared sensor;

FIG. 2 is a side elevational view of the bipedal, anthropomorphic walking platform;

FIG. 3 is a front elevational view of the bipedal, anthropomorphic walking platform;

FIG. 4 is front elevational view of the drive subassembly including the gear frames, drive gear, and crankshaft;

FIG. 5 is an exploded assembly view of the drive subassembly including the gear frames, drive gear, and crankshaft;

FIG. 6 is a bottom elevational view taken along line 6—6 of FIG. 2;

BRIEF DESCRIPTION OF THE PREFERRED EMBODIMENTS

Figure 9:
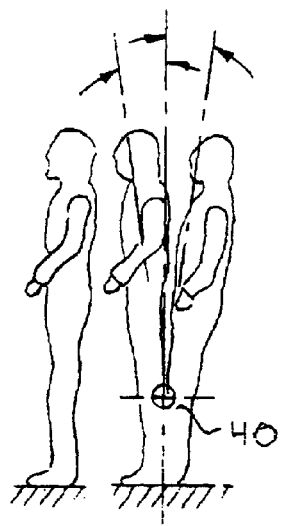
FIG. 9 is a side elevational view of the bipedal, anthropomorphic walking platform showing how its lower center of gravity improves dorsal stability.
Figure 10:
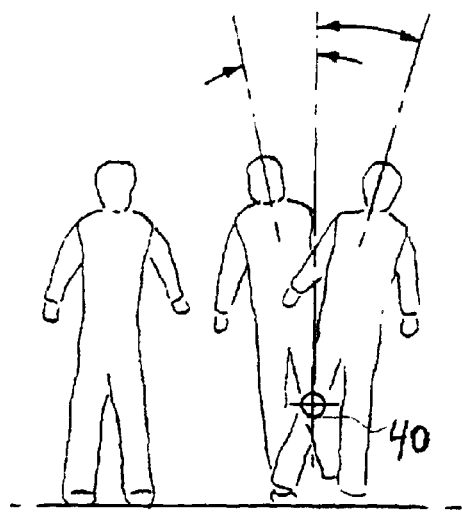
FIG. 10 is a front elevational view of the bipedal, anthropomorphic walking platform showing how its lower center of gravity improves lateral stability.

Referring to FIGS. 1–6, the preferred embodiment of the present invention is one that is bipedal and is fully anthropomorphic. This embodiment includes a motor 10 within the mid-region 12 of the platform that has a drive shaft 14 extending from it. The drive shaft is fixedly attached to a worm gear 16. The teeth of the worm gear 16 are engaged with those of a drive gear 18. Next, the drive gear 18 is fixedly attached to the crankshaft 20 which has a first crank throw 22 and a second crank throw 24 which have a phase angle of 180 degrees between them. Thus, the crankshaft 20 is in communication with the drive shaft 14 via the worm gear 16 and drive gear 18. The crankshaft 20 also rides on two gear frames 26 which act as bearings as the crankshaft 20 rotates. A first connecting rod 28 is rotatably attached to the first crank throw 22. A first pole 30 is then rotatably attached to the first connecting rod 28. In like fashion, a second pole 32 is rotatably attached to the second connecting rod 34, which in turn is rotatably attached to the second crank throw 24. In this way, the poles are mechanically coupled to the motor via the drive shaft 14, worm gear 16, drive gear 18, crankshaft 20, and connecting rods. Near the bottom of the two poles are feet, each of which is capable of supporting the full weight of the figure. The first foot 36 and second foot 37 provide pad pivot points off of which the platform can push as one pole pushes and then another as the platform walks. A first weight 38 and a second weight 39 are also attached to the cavities located on the bottom of these feet in order to lower the center of gravity 40 of the walking platform, making it more laterally and dorsally stable (see FIGS. 9 and 10). Since the center of gravity 40 is lower than that found in the prior art, it is less likely to come close to the edge of the stability envelope of the walking platform or outside of it. This method allows the platform to walk more swiftly than prior art platforms without toppling.

Figure 12:
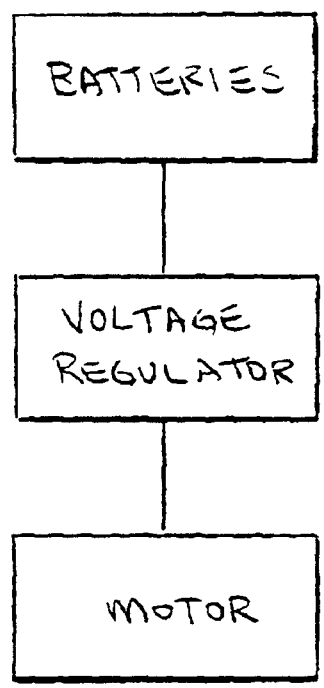
FIG. 12 is a wiring diagram showing how the batteries, regulator, and motor are interconnected.

This embodiment of the invention is energized and powered by a first battery 42 and a second battery 43, each of which is attached to a lower portion of the platform. As current is supplied to the motor 10 through a wire 44, the drive shaft 14 rotates, which also causes the worm gear 16, drive gear 18, and crankshaft 20 to rotate. This rotation is then converted to a stepping motion of the connecting rods and poles, resulting in a motion that mimics that of walking human beings because the two sets of poles and connecting rods have a phase angle of 180 degrees between them. The positions of these batteries also lower the center of gravity of the platform which helps to provide even more stability than that created by the weights attached to the feet. Preferably, a regulator 46 may be interposed between the batteries and the motor 10, thereby allowing adjustment of the voltage supplied to the motor 10 providing the ability to change the speed of the motor 10 and the rate at which the platform walks (see also FIG. 12).

Figure 7:
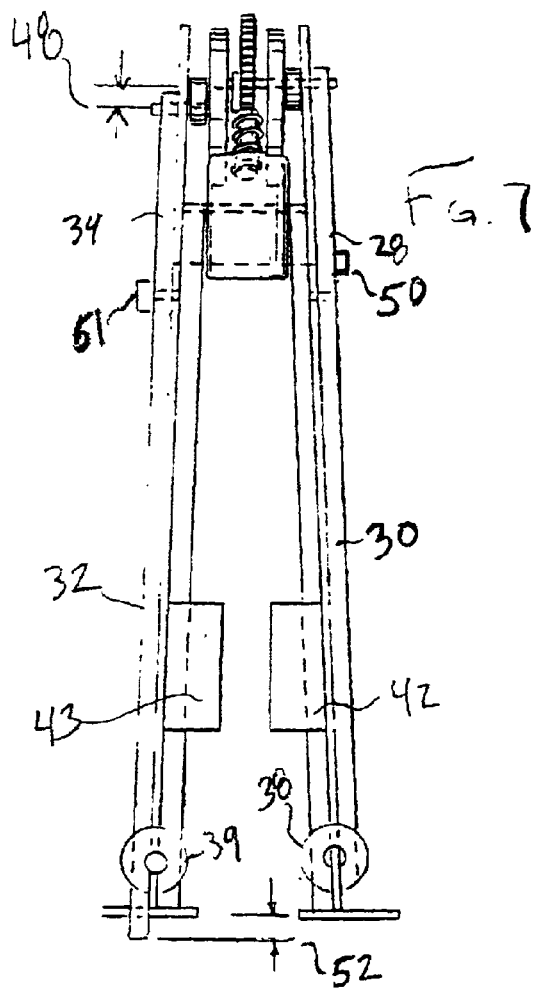
FIG. 7 is a front elevational view of the walking mechanism including the poles, connecting rods, batteries, and motor.
Figure 8:
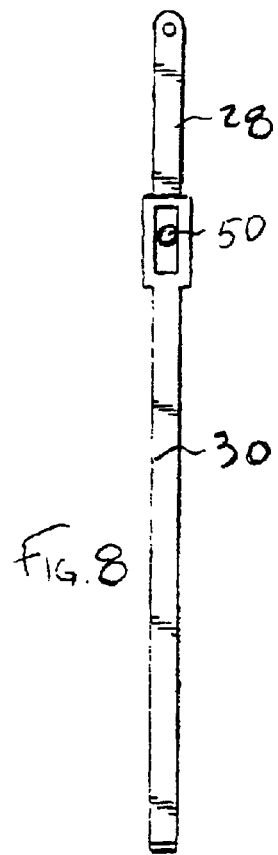
FIG. 8 is a side elevational view of a connecting rod and pole that are connected at an adjustable pivot point.

FIGS. 7 and 8 focus on the walking motion. It should be noted that the distance from the central axis of the crank shaft to the throws determines the height of the step 48 as the platform walks. The height of the step 48 is selected to be within the dorsal and lateral stability envelope of the figure. In addition, this embodiment may include a first adjustable pivot point 50 located at the rotatable connection between the first connecting rod 28 and first pole 30 and a second adjustable pivot 51 point between the second connecting rod 34 and second pole 32. The location of the pivot point controls the length of the stride 52 and the gait radius 54 (shown in FIG. 2) of a leg. The length of the stride 52 and gait radius 54 could also be controlled by changing the length of the pole but it is easier to change the location of the pivot point which makes it a preferable method as compared to changing the length of the pole. These features allow the platform to regulate the length and speed of its stride by changing the effective length of the connecting rods without losing stability. They also allow the user to change the length of stride 52 from one side to another by moving the appropriate pivot points. This method of differing the length of stride 52 of one leg as compared to the other makes the platform capable of walking in a prescribed radius, something that prior art platforms cannot do.

Figure 11:
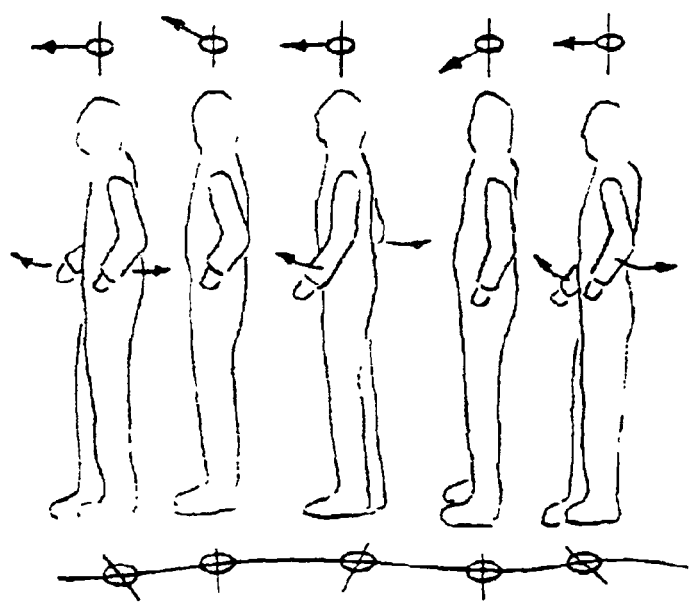
FIG. 11 is a side elevational view of the bipedal, anthropomorphic walking platform showing how the freely pivoting arms and head dampen oscillations.

Another feature of this embodiment is the use of arms 56 and a head 58 as levered components for inertial compensation. FIGS. 1 and 2 show that the arms 56 are rotatably attached to the walking platform allowing them to pivot freely. In addition, the head 58 sits upon a neck rod 60 which is attached to the body of the walking platform. The head has an impression 62 within it that fits on a pivot point 64 situated on the top of the neck rod 60. This allows the head 58 to pivot freely as the platform walks. Within the head 58, there is a stop 66 that prevents the head 58 from rotating once it has rotated for a substantial angle, preventing the head 58 from rotating a full 360 degrees. These components allow the platform to achieve self-stabilization by allowing them to move freely in response to the platform's motion, thereby dispersing energy and dampening lever moment induced oscillations caused by the platform's height as it walks in a manner that is very anthropomorphic (see FIG. 11). This method is effective in creating a platform that can achieve automatic self-stabilization by providing a component that is free to move in response to oscillations caused by the motor or walking motion of the platform, thereby breaking up any harmonic resonance.

Figure 13:
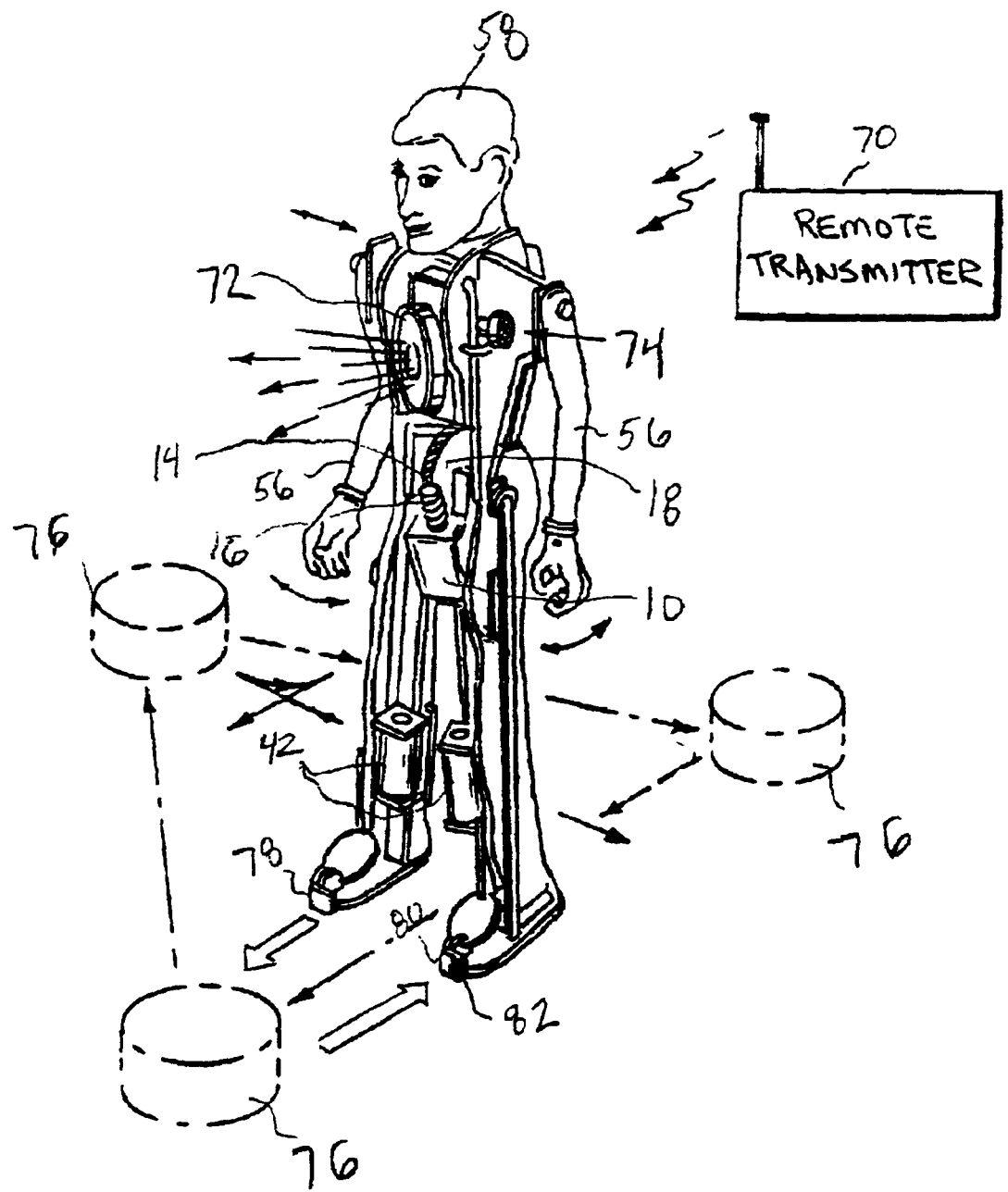
FIG. 13 is a perspective view of a bipedal, anthropomorphic walking platform that can be controlled using voice input and that can also make sound.

Other possible variations of this invention include one in which the platform is remote controlled using a RF board 68, remote transmitter 70, a reversing motor, and a one-way clutch as shown in FIG. 1. With these features, the user can make the platform walk in a straightforward motion and turn in way as mentioned above or the user can engage the reversing motor by means of the one way clutch, causing one leg to move backwards. This would cause the platform to pivot around the stationary foot in a fashion similar to what was described above for the first embodiment of the invention. Another form of control, as shown in FIG. 13, could be voice input and output computer control using a speaker 72 and a microphone 74, allowing the user to tell the robot to walk, turn, stop, and talk. Yet another form of control could be the use of an IR emitter 78, an IR retro sensor 80, retro tape fixed navigational points, and robot specific objects. The platform could gain bearings on objects 76 in its environment by sending out an IR signal through an emitter 78 and detecting a reflected signal through a sensor 80. Then it could move toward them. A simple collision switch 82 would allow the robot to detect contact with these objects 76 and navigational points. Then it would turn and seek the next object 76 and walk toward it. Turning would be accomplished by controlling the pivot point position to change the ratio of left to right stride. These forms of control when coupled with the present invention, provide a walking platform that is very useful as well as very human like.

As can be seen, the present invention fulfills the need for a walking platform that can achieve automatic self-stabilization in an anthropomorphic way. It is also readily apparent to those skilled in the art that the features of the present invention are capable of being applied to platforms with more than two legs as well. While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A walking platform that is capable of achieving automatic self-stabilization comprising:
   a motor within the mid-region of the platform having a drive shaft extending therefrom;
   a pole that is mechanically coupled with said motor, acting as a leg for said platform;
   a body supported by said platform;
   a foot that is capable of supporting the weight of said platform;
   an adjustable pivot point that couples said pole to said motor, said pivot point being located intermediate said drive shaft and said foot allowing said pole to adjustably swing back and forth in a stepping motion without the use of computers, servo controls or computing regulating mechanisms; and
   a battery attached to the lower portion of the leg, thereby lowering the center of gravity of said platform and said body for stable and uniform movement thereof, said battery being capable of energizing said motor for supplying power to said motor, resulting in said pole and said foot providing a waking motion.

2. The platform of claim 1 which further comprises of at least one levered component that is rotatably attached to the platform, allowing it to pivot freely thereby dampening oscillations caused by the motion produced by the walking platform.

3. The platform of claim 2 wherein said pole is mechanically coupled to said motor by way of a crankshaft that is in communication with said drive shaft and a connecting rod that is rotatably attached to said crankshaft while said pole is rotatably attached to said connecting rod at said pivot point.

4. The platform of claim 3 wherein said communication between said crankshaft and said drive shaft comprises: a worm gear that is fixedly attached to said drive shaft; and a drive gear whose teeth mesh with the teeth of said worm gear, said drive gear being fixedly attached to said crankshaft.

5. The platform of claim 4 when said crankshaft comprises a first crank throw and a second crank throw which have a phase angle of 180 degrees between them with said connecting rod being rotatably attached to said first crank throw.

6. The platform of claim 5 which further comprises: a second connecting rod that is rotatably attached to said second crank throw; a second pole that is rotatably attached to said second connecting rod at a second pivot point; and a second foot that is capable of supporting the weight of said platform.

7. The platform of claim 6 which further comprises a first weight attached to said first foot and a second weight attached to said second foot, thereby lowering the center of gravity of said platform.

8. The platform of claim 7 which further comprises a second battery attached to the lower portion of said platform, thereby lowering the center of gravity of said platform, said second battery being attached by a wire to said motor, thereby supplying power to said motor causing it to rotate said drive shaft, said worm gear, said drive gear, and said crankshaft, resulting in said first connecting rod, said second connecting rod, said first pole, said second pole, said first foot, and said second foot providing a walking motion.

9. The platform of claim 8 wherein said first pivot point and said second pivot point may be adjusted, thereby changing the effective length of said first connecting rod and said second connecting rod, allowing a change to the gait radius and the length of stride, giving the platform the ability to turn.

10. The platform of claim 9 wherein a regulator is interposed between any battery and said motor, allowing adjustment of the voltage supplied to said motor, thereby controlling the speed of said motor and the rate at which the platform moves.

11. The platform of claim 10 wherein the levered components comprise two arms that are rotatably attached to the platform, allowing them to pivot freely, thereby dampening oscillations caused by the motion produced by the walking platform.

12. The platform of claim 11 wherein the levered components further comprise a head that sits atop a neck rod, said head being free to pivot for a substantial angle until it is prevented from further rotation by a stop that is connected to said neck rod and is disposed within the head.

13. The platform of claim 12 wherein the platform further comprises a reversing motor and a one-way clutch, allowing said platform to pivot on one leg while the other walks in a backwards fashion, said platform having means to be remotely controlled using a radio frequency signal transmission.

14. The platform of claim 12 wherein said platform includes means to be remotely controlled allowing adjustment of any pivot point, thereby causing said platform to turn.

15. The platform of claim 12 wherein the platform further comprises means for voice input and output computer control, allowing the user to tell the platform to walk, turn, stop, and talk.

16. The platform of claim 12 which uses an infrared retro sensor, retro tape fixed navigational points, robot specific objects, and a collision switch to allow the platform to gain bearings on objects within its environment and move toward them until it contacts them before turning and seeking the next object and walking toward it.

17. The method for achieving automatic self-stabilization of a walking platform comprising: lowering the center of gravity of said platform by attaching weights or batteries to the lower portion of said platform for stable and uniform movement thereof; dampening oscillations caused by the motor or walking motion of said platform by providing at least one levered component that is free to move in response to said oscillations, thereby breaking up any harmonic resonance; and adjustably controlling the ability of a walking platform to turn by changing the length of stride of one leg as compared to another leg motion without the use of computers, servo controls or computing regulating mechanisms.

18. The platform of claim 17 wherein the lower portion of the leg where said battery is attached is said foot.

19. A walking platform that is capable of achieving automatic self-stabilization comprising:

a motor within the mid-region of the platform having a drive shaft extending therefrom;

a pole that is mechanically coupled with said motor, acting as a leg for said platform;

a body supported by said platform;

a foot that is capable of supporting the weight of said platform;

an infrared retro sensor, retro tape fixed navigational points, robot specific objects, and a collision switch to allow the platform to gain bearings on objects within its environment and move toward them until it contacts them before turning and seeking the next object and walking toward it;

an adjustable pivot point that couples said pole to said motor, said pivot point being located intermediate said drive shaft and said foot allowing said pole to adjustably swing back and forth in a stepping motion; and a battery attached to the lower portion of the leg, thereby lowering the center of gravity of said platform and said body for stable and uniform movement thereof, said battery being capable of energizing said motor for supplying power to said motor, resulting in said pole and said foot providing a walking motion.

* * * * *